(12) United States Patent
Kim et al.

(10) Patent No.: US 7,835,632 B2
(45) Date of Patent: Nov. 16, 2010

(54) APPARATUS AND METHOD FOR PHOTOGRAPHING MARINE ORGANISM SPECIMEN

(75) Inventors: Sung Kim, Ansan-si (KR); Ji Na Oh, Ansan-si (KR); Woong Seo Kim, Seongnam-si (KR)

(73) Assignee: Korea Ocean Research and Development Institute, Gyeonggi-do (KR)

( * ) Notice: Subject to any disclaimer, the term of this patent is extended or adjusted under 35 U.S.C. 154(b) by 186 days.

(21) Appl. No.: 12/291,979

(22) Filed: Nov. 14, 2008

(65) Prior Publication Data
US 2010/0027982 A1 Feb. 4, 2010

(30) Foreign Application Priority Data
Aug. 4, 2008 (KR) .................... 10-2008-0075863

(51) Int. Cl.
G03B 15/00 (2006.01)
(52) U.S. Cl. ......................................................... 396/5
(58) Field of Classification Search .................... 396/1, 396/4, 5
See application file for complete search history.

(56) References Cited

U.S. PATENT DOCUMENTS 4,454,210 A * 6/1984 Ariyama et al. ................ 430/31
6,424,802 B1 * 7/2002 Ma ............................... 396/4

* cited by examiner

Primary Examiner—W. B. Perkey
(74) Attorney, Agent, or Firm—Ober / Kaler; Royal W. Craig

(57) ABSTRACT

Apparatus and methods for photographing marine organism specimens are disclosed, capable of easily and motionlessly fixing marine organism specimen even on a sailing ship by epochal improvement to the conventional equipment for photographing marine organism specimens. Diffused reflection does not occur during the photographing, and this facilitates lively and realistic photographing of the marine organism specimens. The apparatus generally comprises a support centrally defined by a round hole, a top-opened cylindrical Petri dish supported at a periphery of the hole of the support by a lower circumference for accommodating therein water and marine organism specimen(s), a top-opened cylindrical cover wherein a lower surface is inserted from an upper surface of the Petri dish and an external lateral surface contacts an inner lateral surface of the Petri dish, whereby surface of water accommodated into the Petri dish is pushed to fix the marine organism specimen, a lighting system irradiating light toward a lateral surface of the Petri dish, and a camera installed upward of the Petri dish.

11 Claims, 8 Drawing Sheets

APPARATUS AND METHOD FOR PHOTOGRAPHING MARINE ORGANISM SPECIMEN

CROSS-REFERENCE TO RELATED APPLICATION

The present application is based on, and claims priority from, Korean Application Numbers 10-2008-0075863, filed Aug. 4, 2008, the disclosure of which is incorporated by reference herein in its entirety.

BACKGROUND OF THE INVENTION

1. Field of the Invention

The present invention relates generally to photography of marine organism specimens and, more particularly to an apparatus and method for photographing marine organism specimens. The apparatus is capable of easily and motionlessly fixing marine organism specimens even on a sailing ship by improving the conventional structure to eliminate diffused reflection, thereby enabling lively and realistic photography of marine organism specimens.

2. Description of the Background

Photographing of fish in ichthyic systems is very important for recording characteristics of specimen, characteristic forms and natures, and colors. Particularly, the colors of fish are most important and useful in species classification for many kinds of fish. Although bright colors of fish suffer from disadvantages in that the bright colors of fish easily disappear when the fish becomes dead or fixed, color photographs of adult fish are frequently reported in abundance. Conversely, it is a reality that reports about color photographs of fingerlings and young fish are rarely found. This is because the fingerlings and young fish are difficult to handle compared to the adult fish, and are more prone to weakening or premature death when they are caught. As a result, their photographing must be conducted with the marine organism specimens still swimming in a water tank, and characteristics of marine organism specimens may be more vivid and realistic when they are photographed in a sailing ship before the specimens are transported to a laboratory.

Referring to FIGS. 1 and 2, a typical setup of marine organism specimen photography equipment 1 includes a support 10 centrally defined by a round hole 15, a top-open cylindrical water tank 20 supported at a periphery of the hole 15 of the support 10 by a lower circumference for accommodating therein water (W) and marine organism specimen (S), a lighting system 30 for irradiating light toward a lateral surface of the water tank 20, and a camera 40 installed at an upper surface of the water tank 20. The photographing may be conducted with the marine organism specimen (S) floating in water (W) of the water tank 20. Although it is not shown in the drawings, the marine organism specimen may be fixed using a needle or a sucker disposed inside the water tank 20.

The typical marine organism specimen photographing equipment 1 suffers from a disadvantage in that a needle or a sucker may be photographed at the same time if the photographing is conducted while the marine organism specimen is allowed to swim in a water tank or the marine organism specimen is photographed using the needle or the sucker. Another disadvantage is that it is difficult to clearly photograph the marine organism specimen when there occurs a pitching or a rolling caused by waves generated in the midst of sailing of a ship to allow the marine organism specimen to swing or to let loose the marine organism specimen from its fixture.

It would be greatly advantageous to solve the aforementioned disadvantages by providing an apparatus and method for photographing marine organism specimens capable of easily and motionlessly fixing marine organism specimen even on a sailing ship by epochal improvement to the conventional structure of photographing equipment of marine organism specimens, whereby diffused reflection does not occur during the photographing of marine organism specimens and lively and more realistic photographing of marine organism specimens results.

SUMMARY OF THE INVENTION

It is, therefore, the primary object of the present invention to provide an apparatus and method for photographing marine organism specimens capable of easily and motionlessly fixing the marine organism specimens even while still aboard a sailing ship.

It is another object to provide a sturdier apparatus and method for photographing marine organism specimens for clearer photography despite pitching or a rolling caused by waves generated in the midst of sailing of a ship, and to prevent the marine organism specimen from swinging or letting loose from its fixture.

It is another object to improve the conventional structure of marine photographing equipment for marine organism specimens to reduce or eliminate diffused reflection during the photographing and lively and more realistic photographing of marine organism specimens results.

This and other objects are accomplished by an apparatus and method for photographing marine organism specimens capable of easily and motionlessly fixing marine organism specimen even on a sailing ship by epochal improvement to the conventional structure of photographing equipment of marine organism specimens, whereby diffused reflection does not occur during the photographing of marine organism specimens and lively and more realistic photographing of marine organism specimens results.

In one general aspect, the apparatus for photographing marine organism specimens may include a support centrally defined by a round hole, a top-opened cylindrical Petri dish supported at a periphery of the hole of the support by a lower circumference for accommodating therein water and marine organism specimen, a top-opened cylindrical cover wherein a lower surface is inserted from an upper surface of the Petri dish and an external lateral surface contacts an inner lateral surface of the Petri dish, whereby surface of water accommodated into the Petri dish is pushed to fix the marine organism specimen, a lighting system irradiating light toward a lateral surface of the Petri dish, and a camera installed upward of the Petri dish.

Implementations of this aspect may include one or more of the following features.

The apparatus may further include a single-colored background plate disposed underneath the support and having a hole larger than that of the support.

The apparatus may further include a stand for vertically and slidably supporting the camera.

The apparatus may further include a water overflow prevention sill having a ring-shaped protrusion along an external lateral upper circumference of the Petri dish to prevent the overflow of water when the cover lies on the Petri dish.

The apparatus may further include a storage tank for accommodating water and connected to an outlet, and a pump for supplying water from the storage tank to an inlet, wherein the Petri dish is piercingly formed with the inlet at one lower end thereof and the outlet at the other end.

The apparatus may further include a filter interposed between the storage tank and the outlet.

Screw threads may be respectively formed at an inner surface of the Petri dish and at an external lateral surface of the cover, where the Petri dish and the cover are screwed together.

Both of the Petri dish and the cover have a transparent lower surface and a translucent lateral surface respectively.

In another general aspect, a method for photographing marine organism specimens may include inserting water and marine organism specimen into a top-opened cylindrical Petri dish, pushing, by a lower surface of a top-opened cylindrical cover, the surface of water accommodated in the Petri dish to fix the marine organism specimen by inserting the cover from an upper surface of the Petri dish to allow an external lateral surface of the cover to contact an inner lateral surface of the Petri dish, irradiating light toward a lateral surface of the Petri dish using a lighting system, and photographing the marine organism specimen using a camera installed upward of the Petri dish.

The apparatus and method for photographing marine organism specimen have an advantage in that water and marine organism specimen can be pressingly fixed between a cylindrical Petri dish and a cover to enable an easy and motionless fixing of the marine organism specimen even on a sailing ship, whereby diffused reflection does not occur during the photographing of the marine organism specimen to enable a lively and realistic photographing of marine organism specimen.

Another advantage is that water is not overflowed outside of the Petri dish by a water overflow prevention sill even if the Petri dish is inserted by the cover.

Still another advantage is that a fast and continuous photographing of marine organism specimens is possible by using storage tank-accommodated water introduced and discharged via a storage tank and a pump and vivid and clear photographs of marine organism specimens can be obtained even if the water is continuously circulated through a filter.

Still further advantage is that the Petri dish and cover are screwed together to enable an easy vertical and slidable movement of marine organism specimens according to thickness of marine organism specimen, where the Petri dish and cover are easily coupled and separated.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is an apparatus and method for photographing marine organism specimens that is capable of easily and motionlessly fixing the marine organism specimens even on a sailing ship and by eliminating diffused reflection, thereby enabling lively and realistic photography of marine organism specimens. The present disclosure will now be described more fully hereinafter with reference to the accompanying drawings, in which illustrative implementations of the disclosure are shown. These implementations are provided make this disclosure thorough and complete. The present disclosure is not intended to be limited to the implementations shown but is to be accorded the widest scope consistent with the principles and features described herein.

Figure 1:
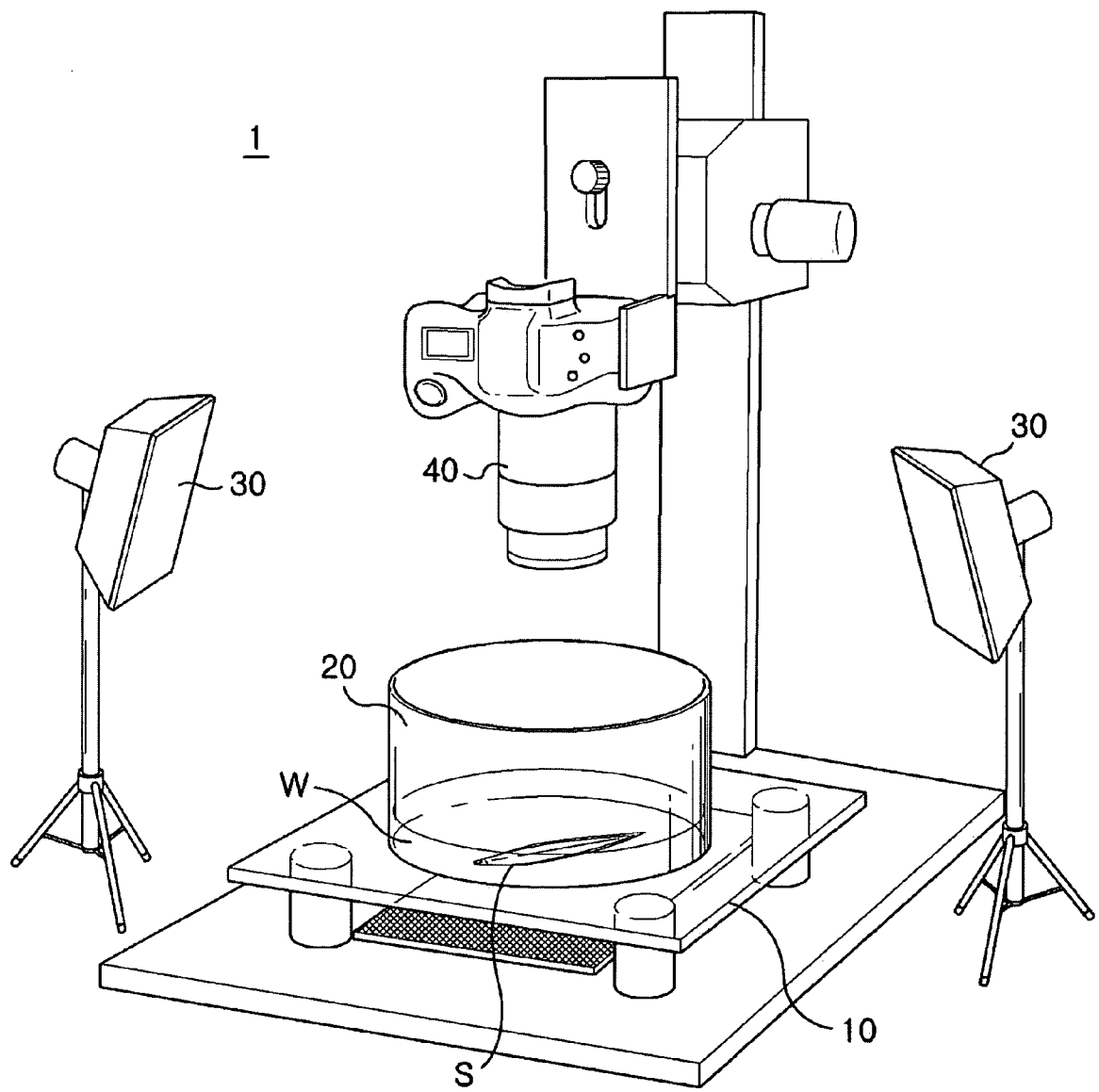
FIG. 1 is a perspective view illustrating a typical apparatus for photographing marine organism specimen.
Figure 2:
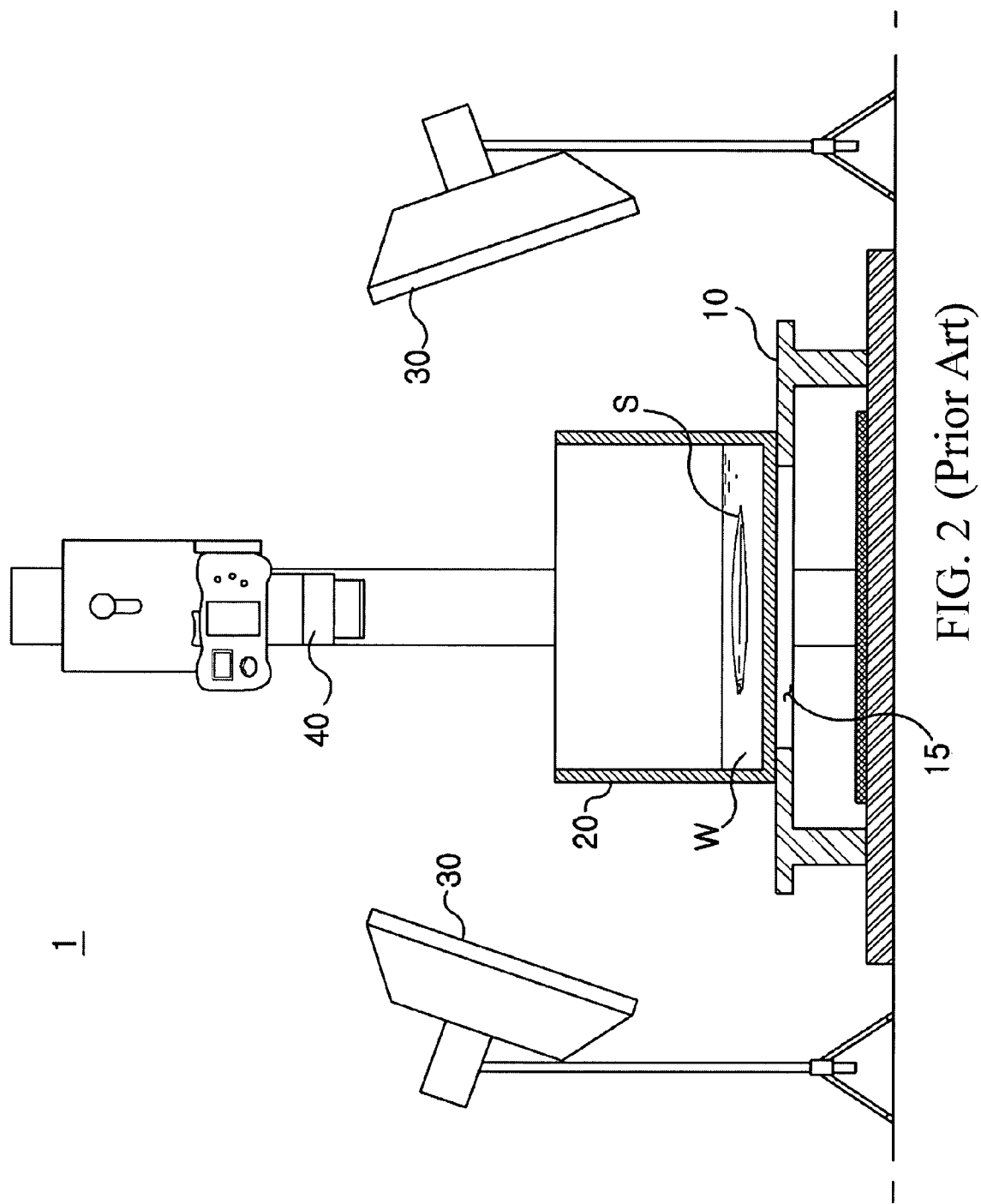
FIG. 2 is a lateral cross-sectional view of a first implementation of FIG. 1.
Figure 3:
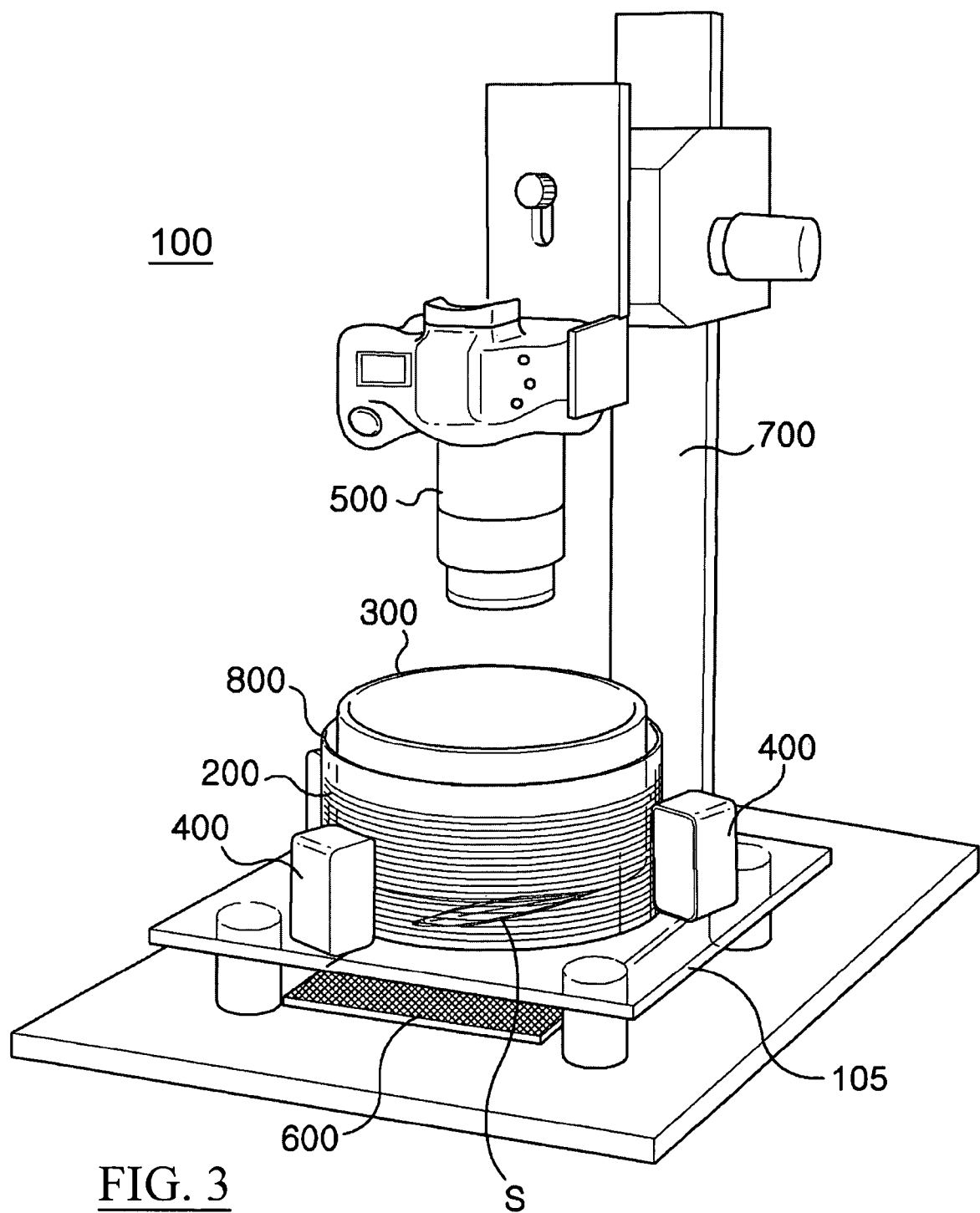
FIG. 3 is a perspective view of one implementation of an apparatus for photographing marine organism specimen according to the present invention.
Figure 4:
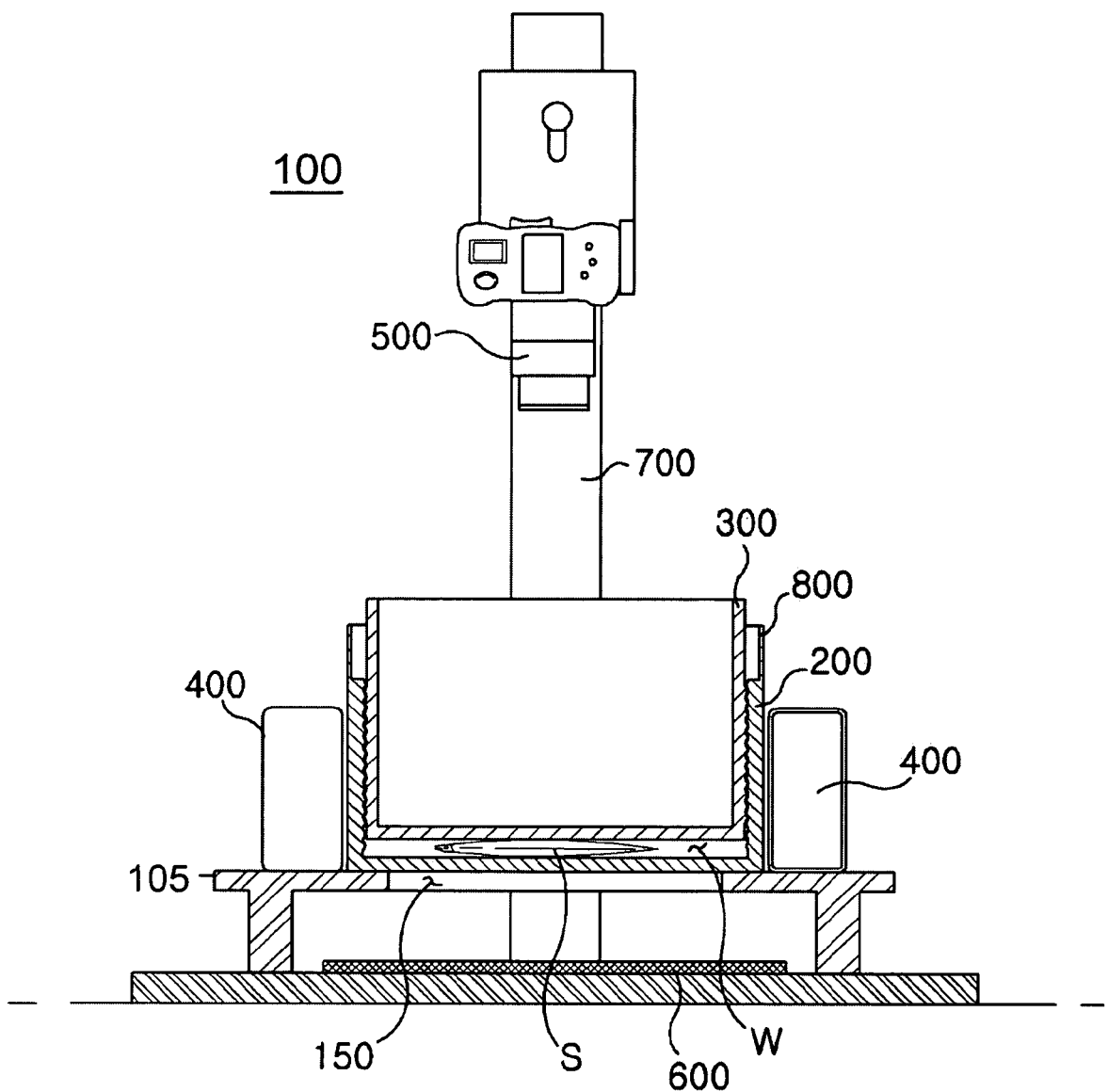
FIG. 4 is a lateral cross-sectional view of the implementation of FIG. 3.
Figure 5:
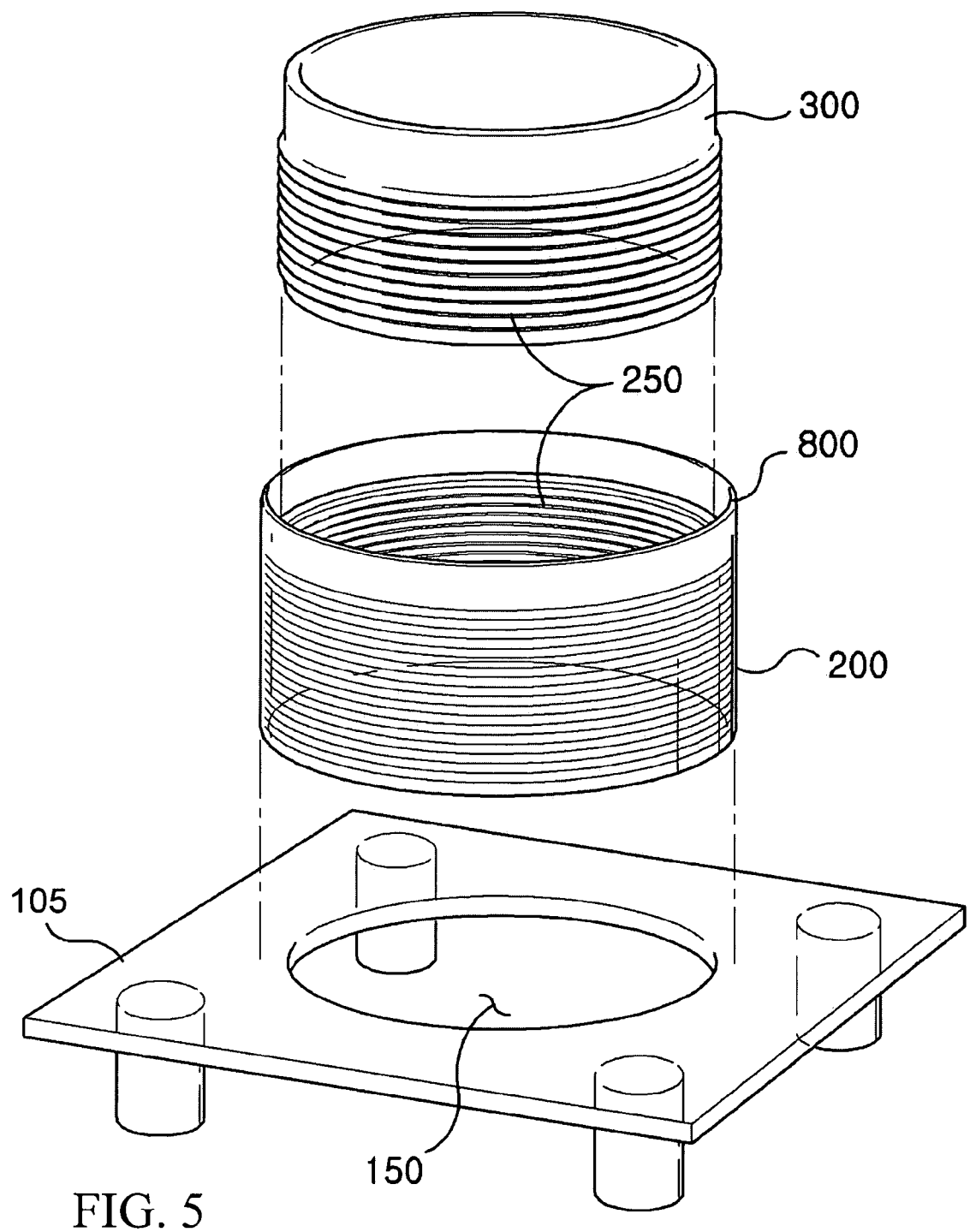
FIG. 5 is an exploded perspective view illustrating a support, a Petri dish and a cover out of the implementation of FIG. 3.
Figure 6:
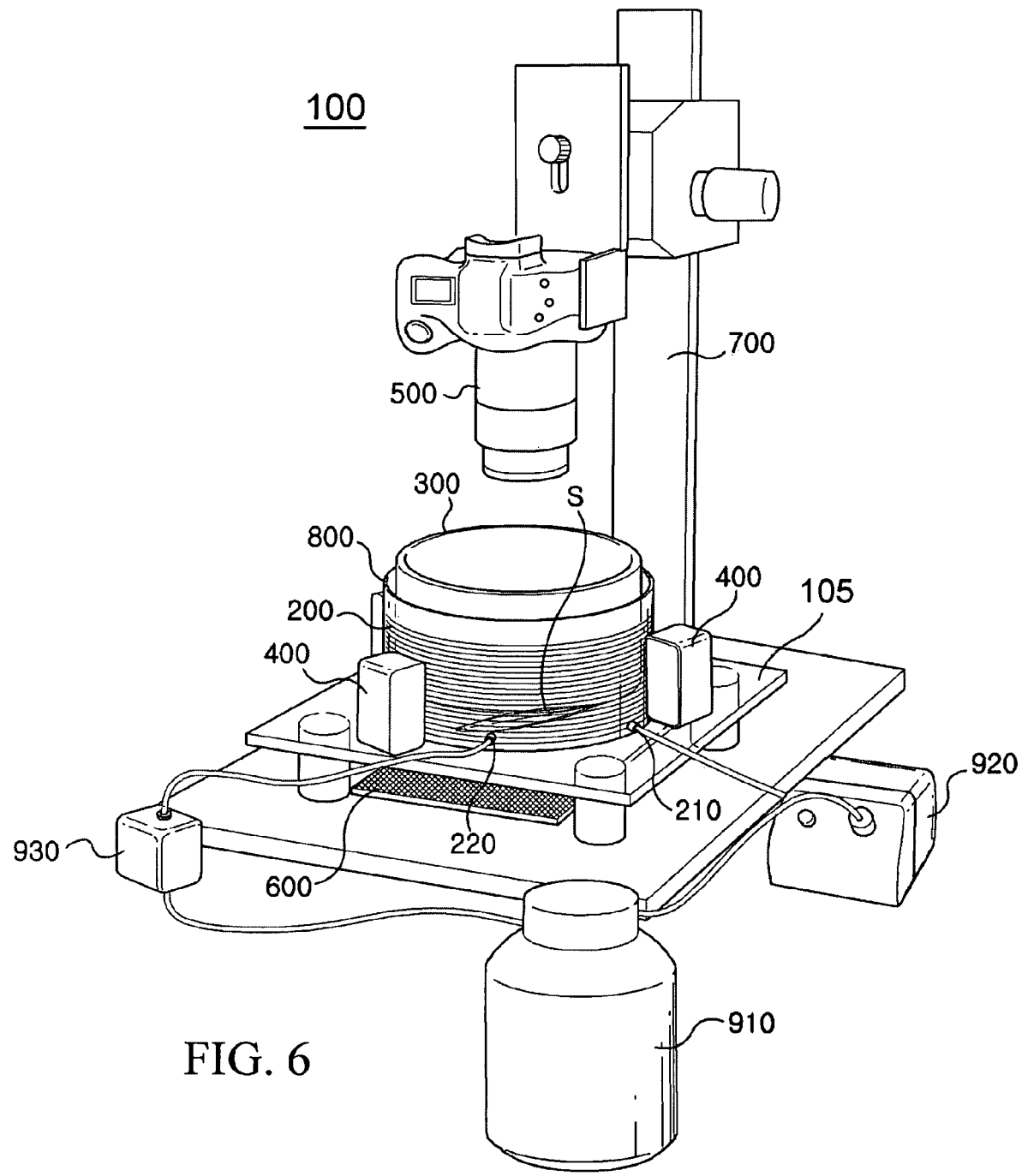
FIG. 6 is a perspective view illustrating another implementation of an apparatus for photographing marine organism specimen.
Figure 7:
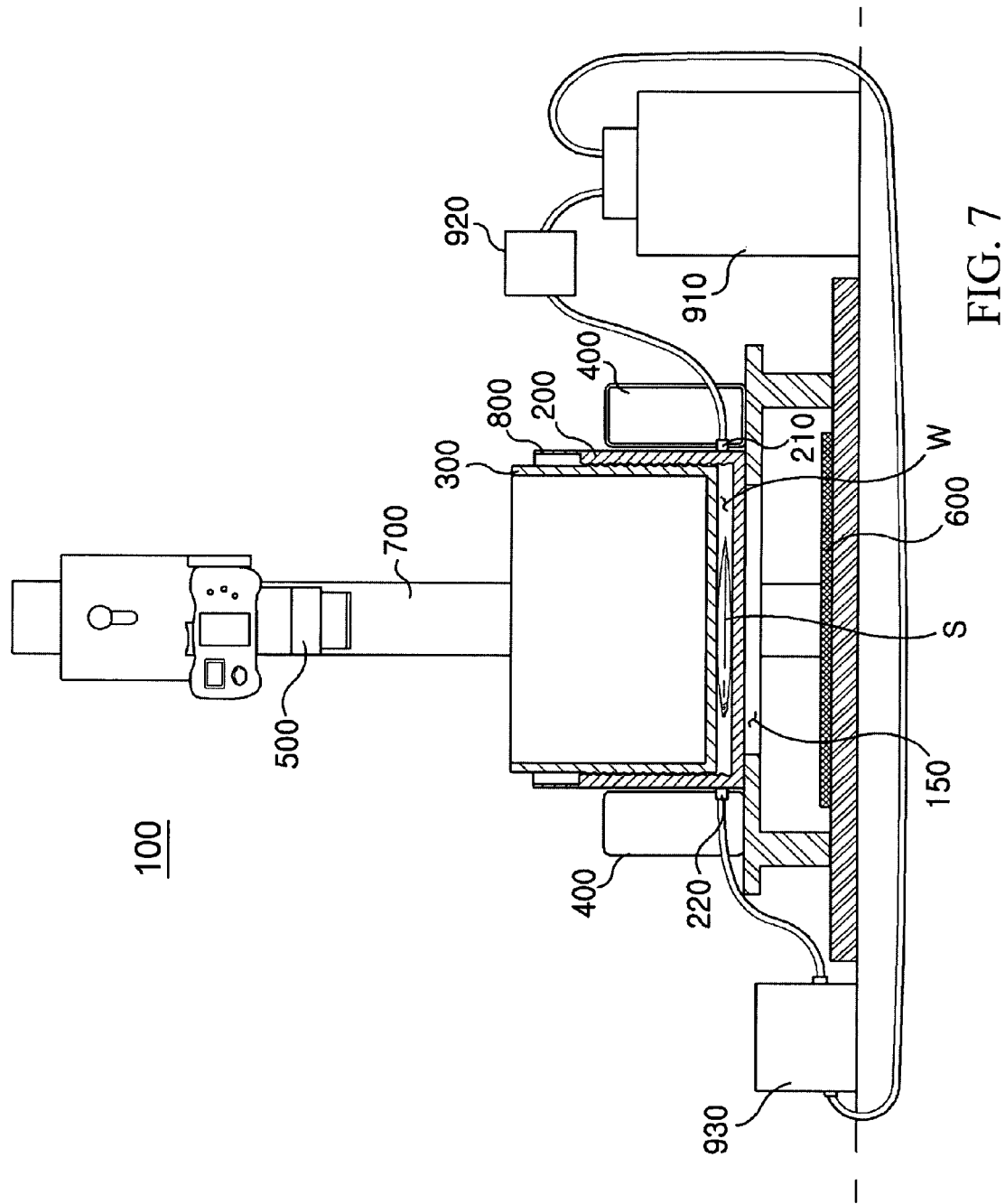
FIG. 7 is a lateral cross-sectional view of the implementation of FIG. 6.

FIG. 3 is a perspective view of one implementation of an apparatus (100) for photographing marine organism specimen, FIG. 4 is a lateral cross-sectional view of the implementation of FIG. 3, FIG. 5 is an exploded perspective view illustrating a support (105), a Petri dish (200) and cover (300) out of the implementation of FIG. 3, FIG. 6 is a perspective view illustrating another implementation of an apparatus for photographing marine organism specimen and FIG. 7 is a lateral cross-sectional view of the implementation of FIG. 6.

Referring to FIGS. 3 to 7, the apparatus (100) for photographing marine specimen may include a support (105), a Petri dish (200), a cover (300), a lighting system (400), and a camera (500). The apparatus may further include a background plate (600), a stand (700), a water overflow prevention sill (800), a water tank (910), a pump (920) and a filter (930).

The support (105) that serves to support the Petri dish (200) (described later) may be centrally formed with a round hole (150), as illustrated in FIGS. 3 to 5. The support (105) made of typical synthetic material and preferably has an area large enough to hold the Petri dish (200). The central hole (150) is so made as to prevent a bottom surface of the Petri dish (200) from being directly touched by an object, thereby avoiding a distorted phenomenon of light during photographing.

The Petri dish (200) may have a top-opened cylindrical shape as shown in FIGS. 3 to 5. A lower circumference of the Petri dish (200) may be supported by the circumferential margins of the support (105) around the hole (150). The Petri dish (200) may hold water (W) and marine organism specimens (S). The cover (300) has a top-opened cylindrical shape and may be inserted from a top end of the Petri dish (200) such that the marine specimen (S) can be fixed by pressing the water (W) accommodated inside the Petri dish (200). An external lateral surface of the cover (300) is coupled with an inner lateral surface of the Petri dish (200).

In other words, as depicted in FIG. 5, the cover (300) is inserted into the Petri dish (200) to allow a bottom surface of the cover (300) to press against the water (W) accommodated inside the Petri dish (200) and to simultaneously fix the marine organism specimen (S). As a result, the water (W) and the specimen (S) can maintain a fixed state free from being affected by external sway or movement even in a sailing ship. When inserting cover (300) it may occur that the water accommodated inside the Petri dish (200) arises along external and internal lateral surfaces of the cover (300) to overflow over the Petri dish (200). A water overflow prevention sill (800) is therefore provided to prevent the water overflow. The water overflow prevention sill (800) may have a ring-shaped protrusion along an external lateral upper circumference of the Petri dish to prevent the overflow of water when the cover is inserted into the Petri dish.

Screw threads may be respectively formed at an inner surface of the Petri dish (200) and at an external lateral surface of the cover (300), where the Petri dish and the cover are screwed together. As a result, height of the cover (300) can be adjusted relative to the Petri dish (200). Various thickness changes of marine organism specimens (S) can be easily fixed by the height adjustment of cover (300).

There may be a need to photograph another marine specimen after a marine specimen accommodated in the Petri dish (200) is photographed. There may be a need of changing the water (W) accommodated in the Petri dish (200) for cleaning the water when the water (W) is dirtied by sediments and the like. In order to change the water (W) accommodated in the Petri dish (200) for clean new water, the storage tank (910) and the pump (920) are installed as shown in FIGS. 6 and 7. In this case, the Petri dish (200) is formed at one lateral lower end with an inlet (210) and is formed at the other lateral lower end with an outlet (220).

In other words, the used or dirtied water (W) is discharged through the outlet (220) while clean new water is introduced into the Petri dish (200) through the inlet (210). The storage tank (910) serving to accommodate water is connected to the outlet (220), and the pump (920) serves to supply water from the storage tank (910) to the inlet (210). The storage tank (910) may be divided into a space connected to the outlet (220) for accommodating the used water, and a space connected to the inlet (210) for accommodating the clean water. Furthermore, the storage tank (910) may have one space where the water discharged via the outlet (220) can be filtered and re-used. To this end, the storage tank (910) may be installed with the filter (930) which is interposed between the outlet (20) and the storage tank (910).

The lighting system (400) is installed so as to irradiate light toward the lateral surface of the Petri dish (200). The lighting system may comprise any structure, such as one or more, but preferably in plural structure for being symmetrically arranged about the lateral surface of the Petri dish (200), whereby there is generated no shadow of marine specimen by the light irradiated from one direction. More preferably, the lighting system has a ring shape and is installed about a lateral circumference of the Petri dish (200). The lighting system may include any light bulbs, such as incandescent light bulbs, fluorescent light bulbs or light emitting diodes (LEDs). It is important however that the lighting system should place an irradiation emphasis on diffusion instead of straight travel.

It is preferable that the lateral surface of the Petri dish (200) and the lateral surface of the cover (300) be translucent, such that the light irradiated by the lighting system (400) can be diffused to light the marine organism specimen (S). However, even in this case, both the lower surfaces of the Petri dish (200) and the cover (300) are preferably transparent to allow the marine specimen (S) fixed between the lower surface of the Petri dish (200) and the lower surface of the cover (300) to be clearly photographed.

The camera (500) is installed upward of the Petri dish (200) to photograph the marine organism specimen (S) fixed between the Petri dish (200) and the cover (300). If the marine specimen is not fixed using the cover (300) after accommodating the water in the Petri dish (200) to allow only the marine organism specimen (S) to be photographed, there may occur a diffused reflection from uneven surface of the wet marine specimen due to flash generated by the lighting system (400) or the camera (500) to prevent a high quality of photographing. In other words, the photographing of the marine organism specimen (S) fixed in the water (W) enables a high quality of lively and realistic photographing of the marine organism specimen (S). Any camera (500) suffices as long as the camera can photograph marine specimens, such that no detailed explanation is given to expound the techniques of camera, which can be embodied by prior art. There may be a case where it is difficult to focus on the marine specimen only using zoom-in or zoom-out function intrinsically installed in the camera (500), such that it is preferable that the stand (700) be mounted to slidably and vertically support the camera (500) for a closer or far-out photographing of the marine specimen.

The background plate (600) mounted underneath the support (105) has a single colored area which is larger than that of the hole of the support (105). A background is formed underneath the support (105) when the marine organism specimen (S) is directly photographed by the camera (500), and the background color may be freely changed using a computer program following the photographing of the marine organism specimen (S). However, if the photographing is conducted with the background plate (600) installed from the very beginning, there is no need of changing the background color using the computer programming. Typically, the background plate (600) is produced in a single color, preferably in white or in black. The reason of making the background plate (600) larger than the hole (150) of the support (105) is to allow the background plate (600) to cover as large area as that of the marine specimen when the marine organism specimen (S) accommodated in the Petri dish (200) supported by circumference of the hole (150) is photographed.

Figure 8:
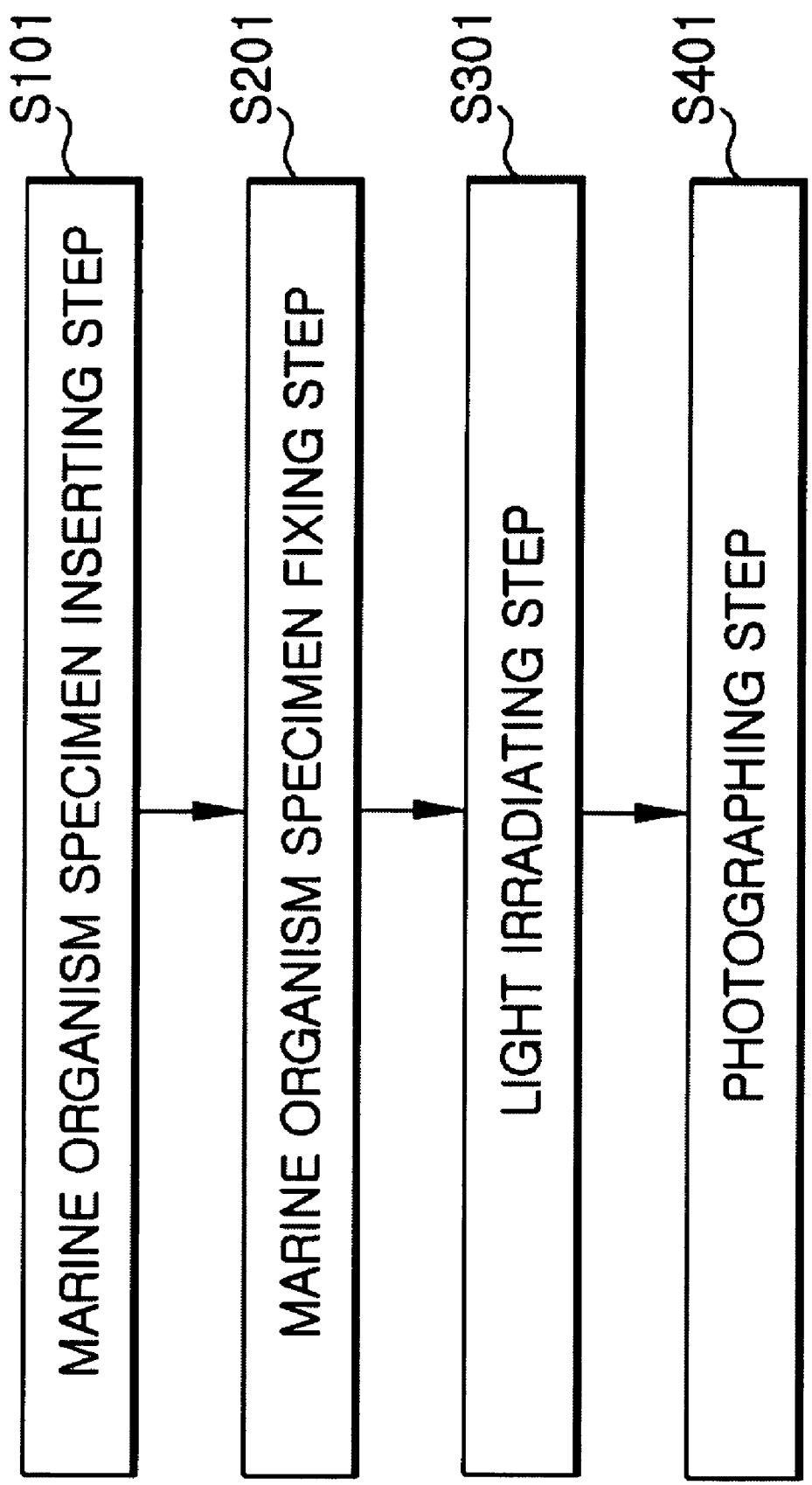
FIG. 8 is a block diagram illustrating one implementation of a method for photographing marine organism specimen.

A method for photographing marine organism specimens is also described with collective reference to FIGS. 6 to 8. It should be noted however that any repeated explanation to each component of apparatus for photographing marine organism specimen will be omitted.

FIG. 8 is a block diagram illustrating one implementation of a method for photographing marine organism specimen.

Referring to FIG. 8, the method for photographing marine organism specimens begins with a first step of inserting marine organism specimen (S101), a second step of fixing the marine organism specimen (S201), a third step of irradiating light (S301), and a fourth step of photographing the marine organism specimen (S401).

The inserting step (S101) of marine organism specimen may include inserting water (W) and marine organism specimen (S) into the top-opened cylindrical Petri dish (200), as shown in FIGS. 6 and 7. The Petri dish (200) is fixed by the support (105) whose center is defined by a round hole.

The marine organism specimen fixing step (S201) may include pushing, by a lower surface of a top-opened cylindrical cover (300), the surface of water accommodated in the Petri dish to fix the marine organism specimen by inserting the cover (300) from an upper surface of the Petri dish (200) to allow an external lateral surface of the cover (300) to be brought into contact with an inner lateral surface of the Petri dish (200). As a result, the water (W) and the marine organism specimen (S) maintains a fixed state between the lower surface of the Petri dish (200) and the lower surface of the cover (300), such that the water (W) and the marine organism specimen (S) are not interfered with by rolling and pitching of the sailing ship.

The irradiating step (S301) may include lighting toward a lateral surface of the Petri dish (200) using the lighting system (400). When the light from the lighting system (400) is irradiated toward the lateral surface of the Petri dish (200), the lighting system (400) is so installed as to create diffusion light lest a shadow be cast on the marine organism specimen (S). The photographing step (S401) may include photographing the marine organism specimen using the camera (500) installed upward of the Petri dish (200). At this time, the photographing should be conducted with a white or black background plate (600) installed beneath the Petri dish (200).

It should now be apparent that the above-described apparatus and method more easily and motionlessly fixes the marine organism specimens, even while still aboard a sailing ship, to allow clearer photography despite pitching or a rolling caused by waves, and to prevent the marine organism specimen from swinging or letting loose from its fixture. Moreover, it reduces or eliminates diffused reflection during the photographing for lively and more realistic photographing of marine organism specimens.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. An apparatus for photographing marine organism specimens, comprising:
    a support centrally defined by a round hole;
    a top-opened cylindrical Petri dish having a lower surface supported on said support peripherally over said hole for accommodating therein water and marine organism specimens;
    a top-opened cylindrical cover having a lower surface for insertion into the Petri dish and an external lateral surface contacting an inner lateral surface of the Petri dish, whereby water accommodated in the Petri dish is pushed between the lower surface of the cylindrical cover and the lower surface of the Petri dish to fix the marine organism specimen;
    a lighting system irradiating light toward a lateral surface of the Petri dish, and a camera installed upward of the Petri dish.

2. The apparatus as claimed in claim 1, wherein the apparatus further comprises a single-colored background plate disposed underneath the support and having a hole larger than that of the support.

3. The apparatus as claimed in claim 1, wherein the apparatus further comprises a stand for vertically and slidably supporting the camera.

4. The apparatus as claimed in claim 1, wherein the apparatus further comprises a water overflow prevention sill having a ring-shaped protrusion along an external lateral upper circumference of the Petri dish to prevent the overflow of water when the cover lies on the Petri dish.

5. The apparatus as claimed in claim 1, wherein the apparatus further comprises a storage tank for accommodating water and connected to an outlet, and a pump for supplying water from the storage tank to an inlet, wherein the Petri dish is piercingly formed with the inlet at one lower end thereof and the outlet at the other end.

6. The apparatus as claimed in claim 5, wherein the apparatus further comprises a filter interposed between the storage tank and the outlet.

7. The apparatus as claimed in any claim 1, wherein screw threads are respectively formed at an inner surface of the Petri dish and at an external lateral surface of the cover, where the Petri dish and the cover are screwed together.

8. The apparatus as claimed in claim 6, wherein screw threads are respectively formed at an inner surface of the Petri dish and at an external lateral surface of the cover, where the Petri dish and the cover are screwed together.

9. The apparatus as claimed in claim 1, wherein both of the Petri dish and the cover have a transparent lower surface and a translucent lateral surface respectively.

10. The apparatus as claimed in claim 7, wherein both of the Petri dish and the cover have a transparent lower surface and a translucent lateral surface respectively.

11. A method for photographing marine organism specimen comprising the steps of:
    inserting water and marine organism specimen into a top-opened cylindrical Petri dish;
    pushing, by a lower surface of a top-opened cylindrical cover, the surface of water accommodated in the Petri dish to fix the marine organism specimen by inserting the cover from an upper surface of the Petri dish to allow an external lateral surface of the cover to contact an inner lateral surface of the Petri dish;
    irradiating light toward a lateral surface of the Petri dish using a lighting system; and
    photographing the marine organism specimen using a camera installed upward of the Petri dish.

* * * * *